United States Patent [19]

Howell

[11] Patent Number: 4,844,665

[45] Date of Patent: Jul. 4, 1989

[54] PORTABLE INDUSTRIAL FILTER SYSTEM

[76] Inventor: William A. Howell, 1482 Sunset Dr., Slidell, La. 70458

[21] Appl. No.: 93,357

[22] Filed: Sep. 4, 1987

[51] Int. Cl.[4] .............................................. B65G 53/60
[52] U.S. Cl. ..................................... 406/173; 406/172; 55/334; 55/341.1
[58] Field of Search ............... 406/168, 170, 171, 172, 406/173, 175, 109; 55/334, 337, 341 R, 379, 302

[56] References Cited

U.S. PATENT DOCUMENTS

| | | | |
|---|---|---|---|
| 3,393,943 | 7/1968 | Kelly | 406/109 |
| 3,424,501 | 1/1969 | Young | 406/171 X |
| 3,874,857 | 4/1975 | Hunt et al. | 55/302 |
| 4,017,281 | 4/1977 | Johnstone | 55/341 R X |
| 4,089,664 | 5/1978 | Noland | 55/341 R |
| 4,298,360 | 11/1981 | Poll | 55/302 X |
| 4,336,041 | 6/1982 | Jolin | 55/341 R |
| 4,695,205 | 9/1987 | Levine | 406/173 X |

FOREIGN PATENT DOCUMENTS 2439716  3/1976  Fed. Rep. of Germany ........ 55/337

Primary Examiner—Joseph F. Peters, Jr.
Assistant Examiner—Paul Salmon
Attorney, Agent, or Firm—Rogers, Howell & Kaferkamp

[57] ABSTRACT

A filter system that is portable and has no moving parts usable for industrial purposes to filter dry fluid substances such as Barite, Hemitite, cement and the like. Within a filter housing are a cyclone separator for removing heavier substance and a fine filter for filtering lighter powdery substance. The inlet to the housing is connectable to the vent of a storage receptacle to which substance is being transferred under the power of a blower. The blower creates the stream that causes substance to flow through the filter system so that no other power means is required. To purge the filter system, a normally capped outlet is connected directly to the storage receptacle and a vent port from the filter housing is connected directly to the blower means. The blower means is operated in spurts to create bursts of air in a direction opposite to the filtering direction to dislodge powder from the fine filter and blow the powder and heavier particles from the filter housing directly into the storage receptacle. Upon completion of the entire operation, the portable filter system can be transported to another site.

8 Claims, 3 Drawing Sheets

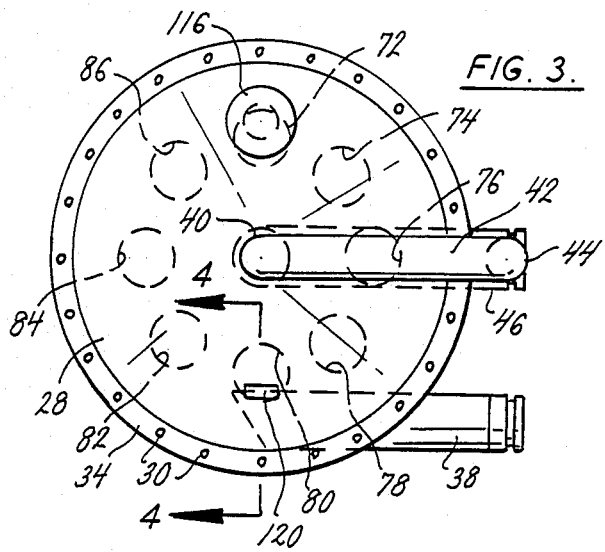
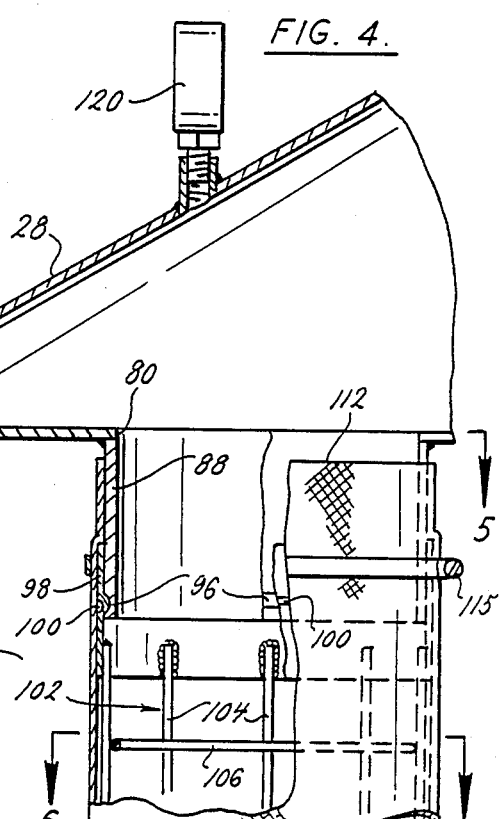
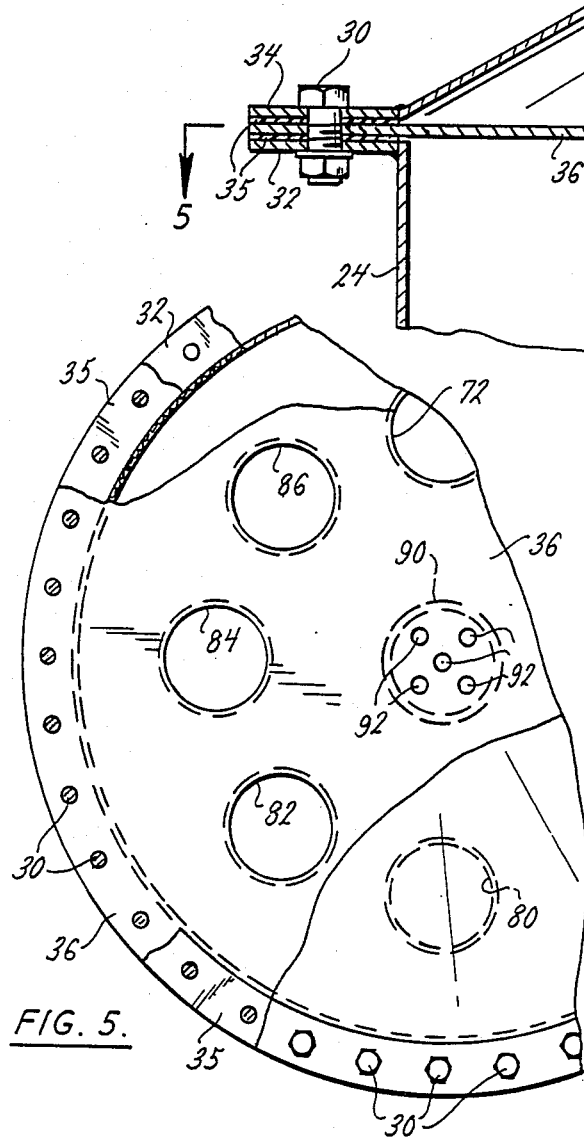
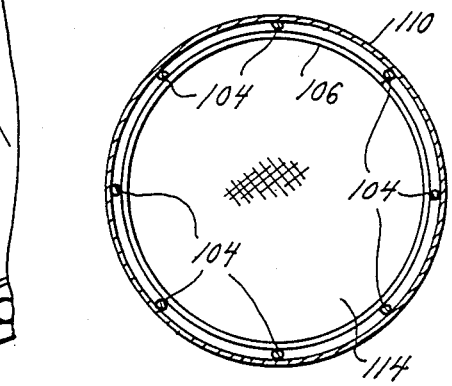

PORTABLE INDUSTRIAL FILTER SYSTEM

BACKGROUND OF THE INVENTION

This invention relates to a portable industrial filter system that is portable for connection to a ventline and that has no moving parts. In particular, the invention relates to a filter system that is adapted for connection to the vent port of a receptacle tank receiver to which dry fluid substance, such as hematite, cement, sand or the like, is being conveyed pneumatically.

Conventionally, various kinds of dry fluid substances, including drilling muds known as barite, hematite, cement, blasting grit, sand and other products are moved pneumatically from one receptacle to another. For example, if a barite is to be used in a drilling operation, it is kept stored in dry powder form. For this purpose there is a storage receptacle on site from which the substance can be withdrawn as needed for use, such as in oil-drilling. To replenish the barite in the storage receptacle, a delivery tanker truck having a closed tank brings the powdered substance to the site. The substance is transferred under pneumatic pressure from the vehicle tank to the storage receptacle. This is done by connecting a hose between the vehicle tank and the storage receptacle and operating a blower to pressurize the vehicle tank. The pressurization of air within the tank causes substance to be entrained in the air, and air and substance flow in a stream through the hose to the storage receptacle. In order for this flow to continue, there must be a vent port in the storage receptacle to relieve the pressure.

Desirably, only air will exit through the vent port. However, many of the substances transferred by this conventional method are of powder form, and much of the substance remains with the exhaust air that is discharged through the vent port to the environment. Conventionally, this substance is allowed to discharge directly into the atmosphere, or the vent line is submerged in a body of water, such as a pond or stream, and the substance is discharged into that water. Both of these discharges into the environment are objectionable.

Many efforts have been made to filter these kinds of powder substances, and the most common effort has incorporated a fan dust collector. A fan dust collector is very expensive, both to build and to maintain, and incorporates its own blowing mechanism, and it is stationary so it can be used only at a particular site. Also, when the fan dust collector fills with substance, a problem is created of how to dispose of that collected substance.

Prior art filter systems have incorporated many constructions. These include a cyclone separator for separating relatively heavy particles from a moving stream coupled with a fine filter system for filtering lighter, more powdery particles. However, the overall construction of the filter system of the subject invention, incorporating no moving parts, retaining the feature of portability, being usable to filter dry fluid substance from a moving air stream, and being purgeable to return collected substance to a collecting receiver, has created a significant advantage over the prior art filter systems.

SUMMARY OF THE INVENTION

This filter system has a filter housing containing a heavy particle cyclone separator and a fine filter air bag assembly. In the filtering mode, the inlet fitting to the housing is connected by a hose to the vent outlet of a storage collection receptacle to which dry fluid substance is being transferred under the pressurization of a blower. A vent port in the filter housing downstream of the air bag assembly relieves pressure by allowing clean filtered air to vent to atmosphere. This vent port also allows the stream of air and substance to continue to flow through the filter system under the pressurization of the blower, and the filter system has no blower of its own. During the filtering mode, the outlet tube leading from the filter housing below the cyclone separator is capped.

The inlet tube is located immediately above the cyclone separator and introduces air and substance tangentially into the filter housing. Heavy particles fall downwardly from the swirling air stream into the cyclone separator. Fine powder is trapped by the air bag assembly which comprises a plurality of eggshell coated socks on wire frames suspended from a filter bag support plate.

There is a pressure gauge installed upstream and a pressure gauge downstream of the fine filter air bags. When the pressure difference measured by the pressure gauges reaches a predetermined level, the operator is alerted to the fact that the air bags have been covered with enough powder substance to interfere with adequate filtering. At that time, or when the transfer of substance from the vehicle tank to the storage receptacle has been completed, this filter system incorporates means allowing it to be purged of substance.

For the purging operation, the hose is removed from the inlet tube to the filter housing and the inlet tube is capped. The outlet tube is uncapped and is connected by a hose to the inlet tube of the storage receptacle. The vent port from the filter system is connected by a hose directly to the blower that theretofore had been used to provide the compressed air to transfer substance from the vehicle tank to the storage receptacle. The blower is operated in spurts to create bursts of pressurized air in a direction through the filter housing opposite to the filtering direction. This reverse flow of air bursts dislodges the powdered substance from the filter surfaces of the filter bags and carries the powdered substance downwardly within the housing into the cyclone separator cone. From there, the powder joins the heavier particles that had been collected in the cyclone separator and all the substance is pulsed from the cyclone separator through the filter outlet tube and its hose connection to the storage receptacle.

Upon completion of the entire operation, the filter system can be transported to another site where its use is needed for another project. Thus, this filter system is completely portable, with no wiring and no piping required. It can be transferred between locations on a pickup truck, and it can be handled either by a fork lift at the site or by a small crane.

The filter system is ready for immediate use when it arrives on location. It can be set up as close as necessary to the source of discharge of substance through a vent receptacle during a substance transfer operation, it can be stored elsewhere when not in use, or it can be transferred to another site.

The present filter system has no moving parts so that it has an extremely long life. The only maintenance required is the occasional replacement of fine filter bags. Because the substance that is collected within the filter system is purged from the filter system and returned to the storage receiver, no product is wasted and yet no product is discharged to the environment. Still, no builtin power source is required, since the filter system incorporates means permitting use of the substance transfer blower means for both the filtering and the purging modes.

BRIEF DESCRIPTION OF THE DRAWINGS

FIG. 3 is a top plan view of the filter assembly;

FIG. 4 is a view in section on an enlarged scale taken along the plane of the line 4—4 of FIG. 3;

FIG. 5 is a view in section taken along the plane of the line 5—5 of FIG. 4;

FIG. 6 is a view in section taken along the plane of the line 6—6 of FIG. 4;

DETAILED DESCRIPTION OF PREFERRED EMBODIMENT

Figure 1:
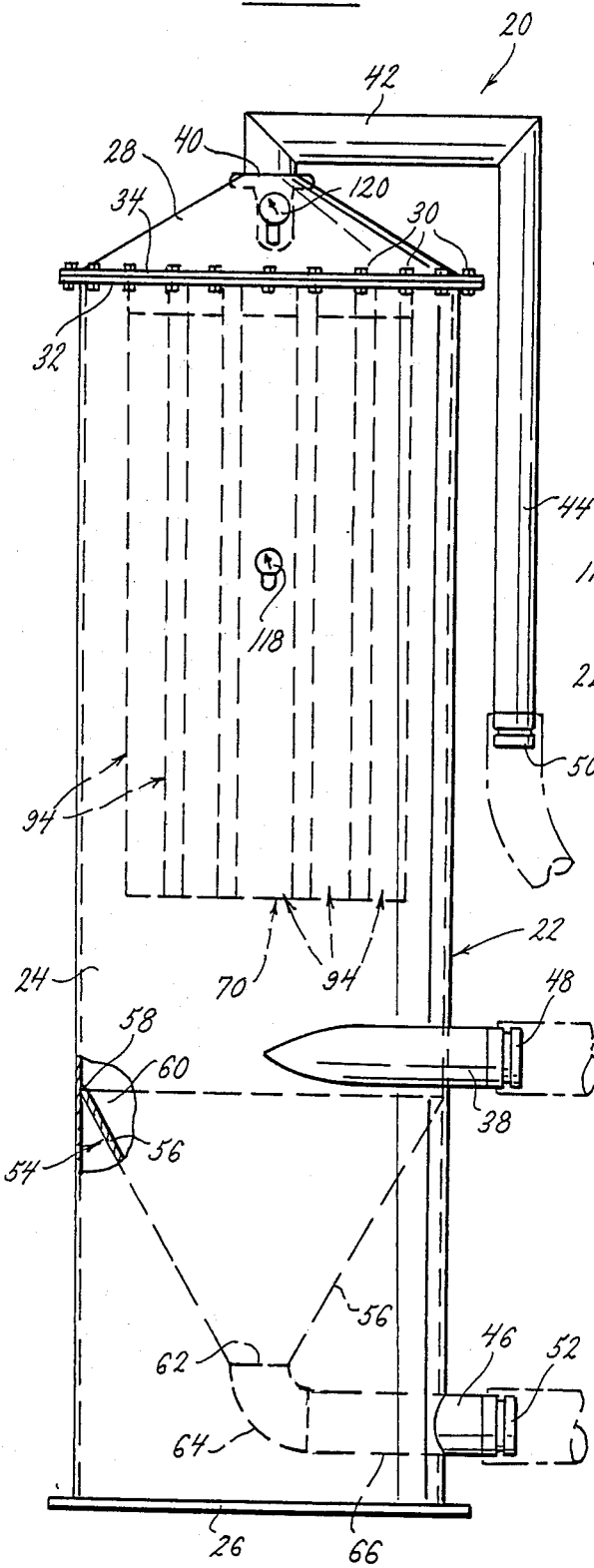
FIG. 1 is a front elevation view of the filter assembly.

As shown in FIG. 1, this filter assembly 20 has an enclosed housing 22 comprising a vertical cylindrical side wall 24 closed by a bottom wall 26 and by an inverted conical top 28. The bottom wall 26 is joined to the cylindrical side wall 24 by welding, whereas the top 28 is connected by a plurality of bolts 30 extending through flanges 32 and 34 provided in the cylindrical side wall 24 and the cover 28, respectively. As FIG. 4 illustrates, the bolts 30 also connect a filter support plate 36 between the flanges 32 and 34, with seals provided by neoprene gaskets 35. The purpose of the filter support plate 36 will be described hereinafter. For now, suffice it to say that the bolts 30 allow the cover 28 to be removed, providing access to the filter support plate 36 which likewise can be removed to provide access to other areas within the housing 22.

Figure 2:
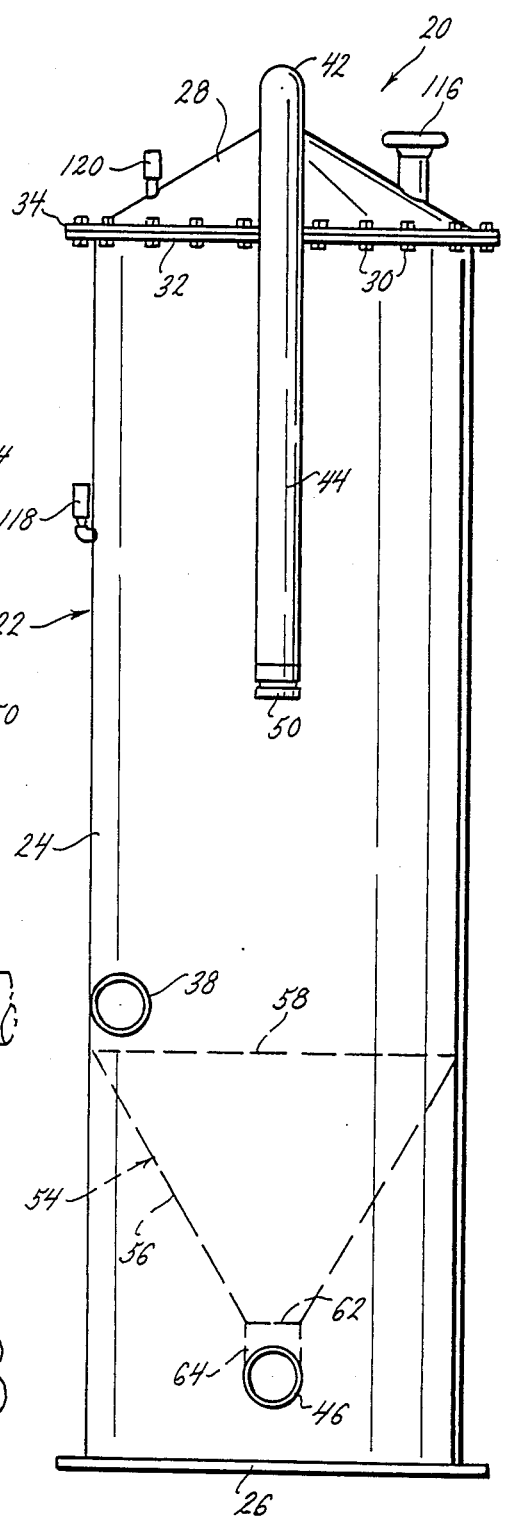
FIG. 2 is a side elevation view of the filter assembly as viewed from the right side of FIG. 1.

Although the housing 22 can be of various sizes, this filter assembly 20 is particularly adapted for industrial applications of the kind that will be described, and for such purposes, it is preferably about nine feet tall and about thirty inches in diameter. At a location about three feet above the bottom plate 26, there is an inlet tube 38 that extends through the cylindrical side wall 24 horizontally and tangentially. At the top of the housing 22, a vent port 40 opens through the center of the inverted conical cover 28. A tube 42 leads from the vent port 40 and has a section 44 that extends vertically down so that the tube opening faces downward as shown in FIGS. 1 and 2.

An outlet tube 46 extends through the cylindrical side wall 24 just above the bottom plate 26. The inlet tube 38, the vent tube 42, and the outlet tube 46 are each provided with conventional quick-connect fittings 48, 50 and 52, respectively, that allow a cap or a hose to be quickly connected or disconnected to them. FIG. 1 illustrates various hoses in dotted lines connected to the inlet tube 38, the vent tube 42 and the outlet tube 46, but it will be understood that these hoses could be replaced with closure caps. It will also be understood that, as will be described, the vent tube 42 is normally open and the outlet tube 46 is normally capped.

Within the housing 22 and immediately below the inlet tube 38, there is a cyclone separator 54. The cyclone separator 54 is in the form of a conical member 56 having its upper perimeter 58 welded to the inner side wall of the housing 22 to provide a large upper opening 60 for receiving relatively heavy foreign matter. The conical member 56 tapers downwardly to a smaller lower opening 62. The lower opening 62 is connected by an elbow 64 and tubing 66 to the outlet tube 46. Thus, the inlet tube 38 introduces air and dry fluid substance just above the cyclone separator 56 and tangential to it. The outlet tube 46 is normally closed by a cap 67 (see FIG. 7), so that no air can flow through it, but the foreign matter collected within the lower portion of the cyclone separator cone 56 can be discharged through the outlet tube 46 when it is uncapped.

The filter support plate 36 supports a fine filter assembly 70. In that connection, the filter support plate 30 has eight holes 72, 74, 76, 78, 80, 82, 84, and 86 through it. As particularly shown in FIG. 3, eight of the holes 72 through 86 are centered on a circle. Surrounding each hole 72 through 86 is a short, downwardly-extending, cylindrical sleeve 88 that is welded to the filter support plate 36. A like short downwardly-extending sleeve 90 is also welded to the filter support plate 36 at its center. There are a plurality of small holes 92 through the plate 36 and within the area of the sleeve 90 (see FIG. 5).

Each short sleeve 88 and 90 supports a fine filter bag assembly 94. Each sleeve 88 has an annular groove 96 to facilitate mounting its respective bag assembly 94. The bag assembly 94 includes a sleeve 98 having an annular detent 100 that snaps within the annular groove 96. A wire frame 102 includes a plurality of vertical wires 104 welded to the sleeve 96 and a plurality of horizontal wire rings 106 welded to the vertical wires 104 to shape the wire frame 102 in the general cylindrical orientation indicated by FIG. 6.

A filter sock 110 that may be of any conventional filtering medium, such as eggshell coated fabric, is fitted over the wire frame 102 and about the sleeve 98. The filter sock 110 has an open upper end 112 and a closed lower end 114 so that air flowing through the sleeves 88 and 90 and through the holes 72 through 86, as well as the holes 92, must first flow through the filter assemblies 94. A removable clamp 115 of conventional design is used to lock each filter assembly 94 in place.

For a housing 22 that is about nine feet tall and about thirty inches in diameter, each filter bag assembly 70 is preferably about 48 inches tall and about 4 ½ inches in diameter. While the holes 72 through 86 are about four inches in diameter, the five center holes 92 are about ½ inch in diameter each. This reduced area of opening within the center sleeve 90 prevents the air flow from being concentrated at the center filter assembly bag as would otherwise result from the central location of the vent port 40.

The housing includes a pressure relief valve 116 through the cover 28. Also, there are pressure gauges 118 and 120. The pressure gauge 118 extends through the side wall 24 to measure air pressure upstream of the fine filter assembly 70, whereas the pressure gauge 120 extends through the cover 28 to measure air pressure downstream of the fine filter assembly 70. When the pressure difference between the areas measured by the gauges 118 and 120 reaches a predetermined value, the operator will know that the fine filter assembly 70 has become clogged and needs cleaning in a manner to be described.

Figure 7:
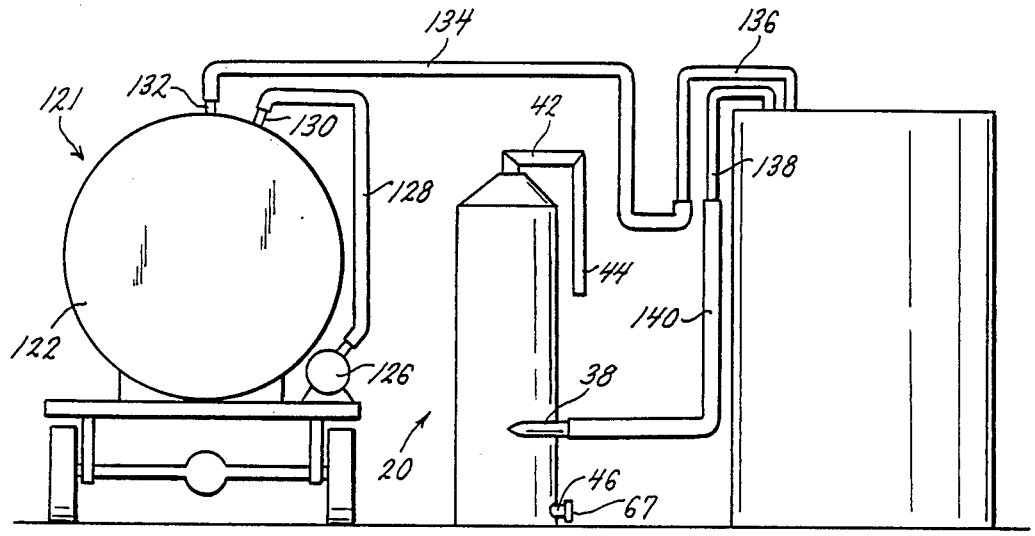
FIG. 7 is a schematic view showing the filter assembly installed between a delivery truck and a receiver in a filtering mode.

FIG. 7 is illustrative of a typical installation and use of the filter assembly 20 in a filtering mode. In this example, a tanker truck 121 has a supply of solid fluid substance, such as barite, hematite, cement, sand, or the like, in its tank 122. A storage receptacle 124 at a delivery site is to receive the substance transferred from the tank 122. The truck 121 carries a power-driven blower 126 that can be connected by a hose 128 to a port 130 in the tank 122.

Another port 132 in the tank 122 is connectable by a hose 134 and an inlet pipe 136 to the storage receptacle 124. Conventionally, without the filter system 20 of this invention, a vent pipe 138 from the receptacle 124 would be left open to atmosphere. With the blower 126 operating, air is forced into the tank 122. The air entrains the solid substance and the resulting stream of air and substance flows through the hose 134 and the inlet pipe 136 into the storage receptacle 124. This flow is permitted because conventionally the vent pipe 138 is always open to atmosphere to release the pressure from within the storage receiver 124. The flow of air and substance continues uninterrupted until all of the substance has been transferred from the tank 122 to the receptacle 124. However, since the vent 138 is open to the atmosphere and remains open to atmosphere during the entire process, some substance escapes with the air through the vent pipe 138. Without use of the filter system 20, this substance is either allowed to discharge to the atmosphere, or is discharged into a pond, or it is discharged through a conventional fan to a conventional dust collector.

Utilizing the present invention, the filter assembly 20 may have been transported to the site by the truck 121 or on a separate pickup truck (not shown). For the present operation, the filter assembly 20 can be left on the truck or it can be temporarily removed from the truck and placed near the storage receptacle 124. In either case, the filter assembly is connected to the storage receptacle 124 by connecting a hose 140 between the vent pipe 138 of the receptacle 124 and the inlet tube 38 to the filter assembly 20. The outlet tube 46 is closed by a cap 67. No additional fans or power need be provided or used. The continuing stream of air and substance discharging from the vent pipe 138 now flows through the hose 140 into the inlet tube 38 where it is introduced tangentially into the filter housing 22.

As the air and substance is discharged into the filter housing 22, the stream swirls and begins to rise within the housing at a reduced rate of speed as heavy particles fall from the air stream. As the stream rises within the housing 22, it swirls toward the center of the housing because the vent port 40 is centralized, and the stream circulates among the fine filter bag assemblies 94. These fine filter bag assemblies filter the finer particles and allow clean filtered air to flow through the holes 72–86 and 92.

Since air seeks the path of least resistance, it will tend to flow through surface areas of the filter bag assemblies 94 that are the least coated with substance. The smaller holes 92, relative to the holes 72–86, contribute to the uniform distribution of air flow among the filter bag assemblies 94. Clean filtered air is discharged through the vent port 40 and the tube 42 to atmosphere.

Figure 8:
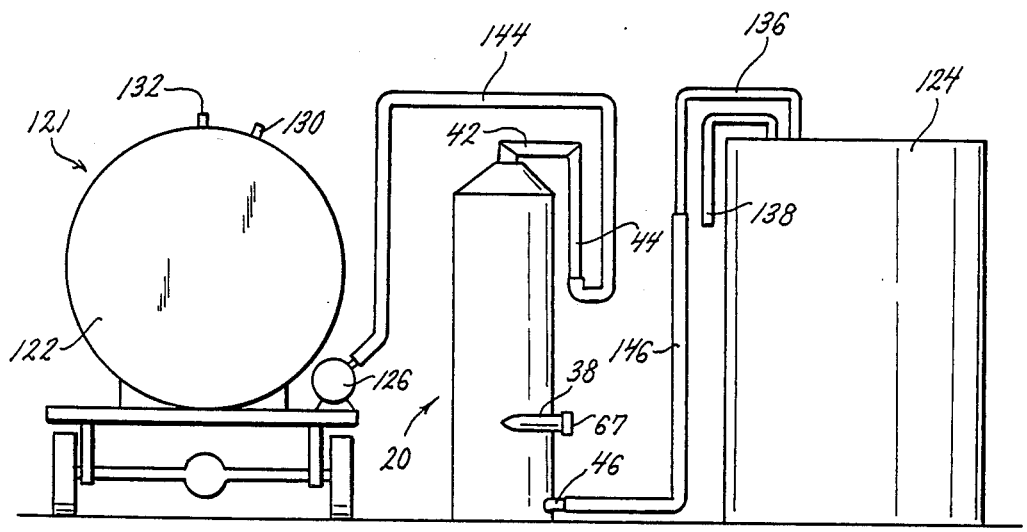
FIG. 8 is a schematic diagram showing the filter assembly installed in a filter-cleaning or purging mode.

When the receptacle 124 has been filled, or during filling when the pressure gauges 118 and 120 indicate that a predetermined pressure differential, such as 5 psi, exists between the upstream and downstream areas within the filter housing 22, the filter assembly 20 can be purged. FIG. 8 illustrates a typical purging operation.

For this, the cap 67 is removed from the outlet tube 46 and is installed on the inlet tube 38.

The hose 128 is disconnected from the blower 126 and the port 130 of the tank 122 and the hose 134 is disconnected from the port 132 of the tank 122 and the inlet tube 136 to the storage receptacle 124. The blower 126 is connected by a hose 144 (which may be the same hose 128 as previously used) directly to the vent tube 42 of the filter assembly 20. Another hose 146 (which may be the hose 134 as previously used) is connected from the outlet tube 46 to the inlet tube 136 of the storage receptacle 124. Now, when the same blower 126 is operated, it blows air through the filter assembly 20 in a purging direction opposite to the previously described filtering direction.

The blower 126 is operated in short bursts, producing air pulses that dislodge the substance from the surfaces of the fine filter assemblies 94 that had collected there during the filtering mode. This dislodged substance flows with the air stream bursts downwardly into the cyclone separator cone 56. The continued bursts of air carry that substance, as well as the heavier substance that had fallen into the cyclone separator during the filtering mode, outwardly through the tube 66, the outlet tube 46, and the hose 146, into the storage receptacle 124. Because the blower 126 is operated in bursts, and because the concentration of substance in the air is very low during this purging mode, substantially clean air discharges through the vent tube 138 leading from the storage receptacle 124 to atmosphere.

Upon completion of the transfer of substance and of the purging of the filter assembly 20, the filter assembly 20 can be loaded back on the truck 121 or a pickup truck (if it had been removed) and taken with the truck for a subsequent use at a new site. Thus, the filter assembly 20 is completely portable. Since it has no moving parts and is long-lasting, with only the filter bag assemblies 94 needing occasional replacement, the filter assembly 20 can be used for a long period of time at many sites where foreign matter would otherwise be discharged to the environment.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. In a dry fluid substance-conveying system of the kind having a closed container for containing a supply of the substance, a receptacle for receiving the substance, a conduit connectable between the container and the receptacle, blower means for establishing superatmospheric pressure within the container causing substance to flow from the container through the conduit to the receptacle, and a normally open vent in the receptacle for relieving pressure and allowing the substance to flow upon operation of the blower means, the improvement comprising a filter system having a filter housing, an inlet to the filter housing for introducing a stream of air laden with dry fluid substance into the filter housing, a vent port communicating with the interior of the filter housing at a location spaced from the inlet, a cyclone separator in series and below with fine particle filter means within the housing and in the path of air and dry fluid substance flowing in a filtering direction from the inlet to the vent port for separating dry fluid substance from the stream of air flowing through the filter means to allow clean air to exit through the vent port, the cyclone separator having an open top cone, the fine particle filter means comprising a plurality of filter bags, each filter bag comprising a filter sock mounted on a wire cage, a mounting plate within the housing adjacent the vent port, means for supporting the filter bags from the mounting plate with the mounting plate positioned between the filter bags and the vent port, holes through the mounting plate corresponding to the filter bags and circumscribed by the socks of such filter bags whereby air exiting through the vent port must first pass serially through the socks and through the holes, a conduit for connecting the inlet to the vent in the receptacle for receiving air and substance vented from the receptacle as the blower means operates, an outlet from the housing below the cyclone separator, removable cover means to close the outlet whereby air flow is from the inlet to the vent port, cover means to close the inlet whereby the vent port can be connected directly to the blower means, the inlet covered, and the outlet connected to the receptacle to dislodge substance from the fine filter means and blow substance therefrom and from the cyclone separator into the receptacle, the filter system being free of a power driven air mover and relying wholly upon the blower means to cause air and dry fluid substance to flow through the filter assembly.

2. The filter assembly of claim 1 wherein the inlet is tangential to and adjacent the top of the cone of the cyclone separator.

3. The filter assembly of claim 1 wherein at least one of the filter bags is located closer to the vent port than are other of the filter bags, the effective area of the holes circumscribed by the sock associated with said closer filter bag being smaller than the effective area of the holes associated with each of said other filter bags.

4. In a dry fluid substance-conveying system of the kind having a closed container for containing a supply of the substance, a receptacle for receiving the substance, a conduit connectable between the container and the receptacle, blower means for establishing super-atmospheric pressure within the container causing substance to flow from the container through the conduit to the receptacle, and a normally open vent in the receptacle for relieving pressure and allowing the substance to flow upon operation of the blower means, the improvement comprising a filter system having a filter housing, an inlet to the filter housing for introducing a stream of air laden with dry fluid substance into the filter housing, a vent port communicating with the interior of the filter housing at a location spaced from the inlet, filer means within the housing and in the path of air and dry fluid substance flowing in a filtering direction from the inlet to the vent port for separating dry fluid substance from the stream of air flowing through the filter means to allow clean air to exit through the vent port, a conduit for connecting the inlet to the vent in the receptacle for receiving air and substance vented from the receptacle as the blower means operates, the filter system being free of a power driven air mover and relying wholly upon the blower means to cause air and dry fluid substance to flow through the filter assembly, a normally closed outlet port in the filter housing spaced from the vent port, means for opening the normally closed outlet port, means for closing the inlet, conduit means for connecting the normally closed outlet port to the receptacle, and conduit means for connecting the blower means to vent the port to cause air to be blown through the filter means in a direction opposite to the filtering direction to remove substance from the filter means and convey the removed substance to the receptacle.

5. A method of transferring a powder substance from a container to a receptacle wherein the container has an associated powder means for pressurizing the container and thereby blow air with substance entrained therein to the receptacle and the receptacle has a vent to relieve pressure from within the receptacle resulting from the inblown air and entrained substance comprising the steps of connecting a conduit between the container and the receptacle, operating said power means for blowing air into the container for entraining substance and carrying the substance in a stream through the conduit to the receptacle, connecting portable filter means to the vent and utilizing the already flowing stream as the medium for conveying air and substance from the receptacle through the filter means and thereby separating substance from the air stream so that filtered air will discharge from the filter means, continuing the foregoing until a predetermined amount of substance has been transferred from the container to the receptacle, and thereafter disconnecting the filter means from the receptacle vent.

6. A method of transferring a powder substance from a container to a receptacle comprising the steps of providing a vent in the receptacle to relieve pressure from within the receptacle, connecting a conduit between the container and the receptacle, blowing air from a blower into the container for entraining substance and carrying the substance in a stream to the receptacle, connecting filter means to the vent and utilizing the already flowing stream as the medium for conveying air and substance from the receptacle through the filter means and thereby separating substance from the air stream so that filtered air will discharge from the filter means, reversing the direction of flow through the filter means to dislodge substance therefrom, and collecting the discharge substance and utilizing the blower for returning the dislodge substance to the receptacle.

7. The method of claim 6 wherein the filter means includes a heavy particle separator and a fine filter and including the steps of passing the air stream serially through the heavy particle separator, the fine filter, and a discharge vent from the filter means, providing an outlet from the filter means adjacent the heavy particle separator, maintaining the outlet closed during the step of separating substance from the air stream, and opening the outlet, closing the inlet, and connecting the outlet to the receptacle during reversing the direction of flow.

8. The method of claim 7 including the step of operating the blower to create bursts of air during reversing the direction of flow.

* * * * *